ST. GEORGE CRAIG.
BISCUIT CUTTER.
APPLICATION FILED MAR. 9, 1910.
965,991.
Patented Aug. 2, 1910.
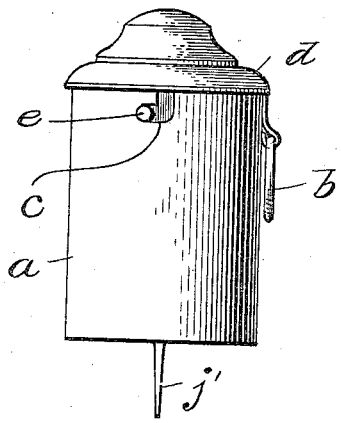
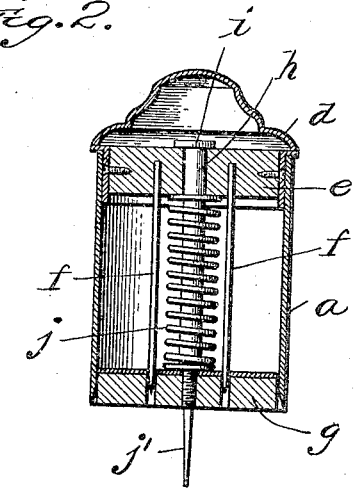
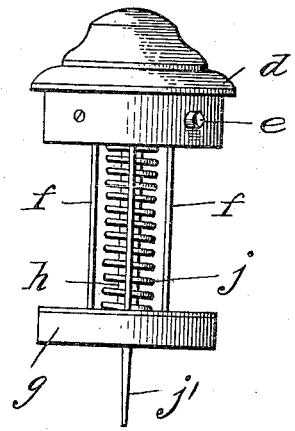
Witnesses
Edwin L. Jewell
Bernice I. Bridges
Inventor
St George Craig.
By Davis & Davis,
Attorneys
THE NORRIS PETERS CO., WASHINGTON, D. C.

UNITED STATES PATENT OFFICE.

ST. GEORGE CRAIG, OF CLARKSVILLE, TENNESSEE.

BISCUIT-CUTTER.

965,991.  Specification of Letters Patent.  Patented Aug. 2, 1910.

Application filed March 9, 1910. Serial No. 548,118.

*To all whom it may concern:*

Be it known that I, ST. GEORGE CRAIG, a citizen of the United States, and a resident of Clarksville, in the county of Montgomery and State of Tennessee, have invented certain new and useful Improvements in Biscuit-Cutters, of which the following is a full and clear specification, reference being had to the accompanying drawing, in which—

Figure 1 is a side elevation of the device complete; Fig. 2 a vertical sectional view thereof; and Fig. 3 a side elevation of the mechanism detached from the cutting cylinder.

The object of this invention is to provide a simple hand device for rapidly and easily cutting out and perforating biscuits, the device having embodied in its construction means for automatically ejecting the biscuit from the cutting cylinder after the biscuit is cut as more fully hereinafter set forth.

In the drawing, $a$ is a cylinder whose lower rim is preferably beveled slightly to an edge sufficiently sharp to readily cut through dough and yet not sharp enough to endanger the hands of the operator. The upper end of this cylinder is provided exteriorly with a ring $b$ for hanging it upon a convenient nail or peg, and also at the diametrical opposite sides with a pair of bayonet slots $c$. The upper end of the cylinder is adapted to be closed by a cap $d$ whose lower edge telescopes into the cylinder and is locked therein by a pair of pins $e$ adapted to engage the aforesaid bayonet slots. This cap is dome shaped and within its rim is fastened a disk $e$ of wood or other material through the center of which is formed a hole.

Rigidly attached to the disk $e$ and depending to a point nearly in the same horizontal plane with the cutting edge of the cylinder is a series of four sharpened perforating pins $f$. Within the cylinder is mounted another disk or head $g$ which is preferably made of wood and which loosely fits the cylinder so as to freely slide up and down therein. This disk $g$ is rigidly attached to a vertical rod $h$ which extends centrally up through said hole in the disk $e$ and is provided with a head or flange $i$ at its upper end. Between the disk $e$ and the disk $g$ is a coil spring $j$ which normally tends to expand and therefore normally pushes the disk $g$ down to the limit of its movement, which limit brings its lower face approximately in the same plane with the lower edge of the cutter. The head or flange $i$ forms a stop to limit the downward movement of the disk $g$. The perforating pins $f$ are adapted to work through holes in the disk $g$. Projecting centrally downwardly from the disk $g$ is a pin $j'$ which is sharpened sufficiently to readily pass through the dough but not sufficiently to cut into the dough board. This pin $j'$ is preferably formed from an extension of the rod $h$, as shown.

To cut biscuits with this device the operator simply forces it down upon the layer of dough on the dough-board, and when the cutter strikes the board the operator turns or rotates the device slightly in order to cut the biscuit nicely from the sheet of dough. In pressing down the cutter, the pin $j'$ forces up the disk $g$ against the action of the spring $j$, and this upward travel of the disk $g$ prevents its coming in contact during this upward movement with the dough. The pins $f$ however being stationarily affixed to the upper disk are caused to pass into the biscuit as the biscuit passes up into the cutting cylinder. The central pin $j'$ also makes a central perforation in the biscuit. The dome of the cap permits the headed end of the rod $h$ to pass above the disk $e$ sufficiently high to permit the complete severance of the biscuit. After the biscuit is cut and perforated in the manner above described, the operator relieves the pressure on the device and then the spring $j$ comes into action and forces the disk $g$ into contact with the biscuit and thus ejects the same from the cutting cylinder.

It will be observed that the cutting cylinder may be removed from the mechanism for the purpose of cleaning both parts, and also that the ejector $g$ rises into the cylinder ahead of the biscuit being cut thus relieving the dough of the work of raising the ejector, throwing that work entirely upon the stout central pin $j'$. The ejector is guided easily in its vertical movements by the cylinder and by the pins $f$. The dome on the cap not only affords a convenient and comfortable means for pressing the cutter through the dough by bringing the palm of the hand in contact therewith but also forms a housing for the central rod $h$. This rod $h$ serves not only to assist in guiding the ejector but also as means for limiting its movement in an ejecting direction. It also serves as a direct support for the central push pin $j'$.

It will therefore be observed that my device has numerous practical advantages.

Having thus fully described my invention, what I claim as new, and desire to secure by Letters Patent, is—

1. In combination, a cutting cylinder, perforating and ejecting devices, and a removable cap or cover for the cutting cylinder carrying means for attaching to it said perforating and ejecting means.

2. In combination, a cutting cylinder, a dome shaped cap thereon, perforating pins and means for attaching them to the cap, an ejecting disk within the cylinder and carrying a push pin, and means for normally forcing the ejector outwardly to a limited distance.

3. In combination, a cylinder cutter, a covered cap attached to the upper end thereof, a disk fastened within the cap and carrying perforating pins, an ejecting disk within the cylinder through which said pins pass, a push pin carried by the ejector, a rod attached to the ejector and extending up through the disk in the cap and provided with a head thereabove, a coil spring surrounding said rod between said disk and said ejector, for the purposes set forth.

4. In combination, a cylindrical cutter, a cap attached to its upper end, a series of perforating pins and means for attaching them to the cap, an ejecting disk fitted within the cylinder and provided with holes through which the perforating pins may pass, a push pin projecting from the outer face of this disk to a point beyond the cutting edge of the cylinder, and a spring located between said disk and the cap normally forcing the disk toward the cutting end of the cylinder and adapted to be compressed when the push pin forces the disk up into the cylinder.

In testimony whereof I hereunto affix my signature in the presence of two witnesses this 4 day of March 1910.

ST. GEORGE CRAIG.

Witnesses:
E. C. HARELSON,
W. G. DUNLAVY.